United States Patent [19]

Ideta et al.

[11] Patent Number: 5,778,023
[45] Date of Patent: Jul. 7, 1998

[54] DATA REPRODUCING APPARATUS FOR SPREAD SPECTRUM SIGNAL

[75] Inventors: Nobuhiko Ideta; Ryuzo Nishi, both of Fukuoka, Japan

[73] Assignee: Matsushita Electric Industrial Co., Ltd., Osaka, Japan

[21] Appl. No.: 597,255

[22] Filed: Feb. 6, 1996

[30] Foreign Application Priority Data

Feb. 8, 1995 [JP] Japan ................................. 7-021877

[51] Int. Cl.$^6$ ........................... H04B 15/00; H04K 1/00; H04L 27/30
[52] U.S. Cl. ............................... 375/208; 375/343
[58] Field of Search ............................. 375/200, 208, 375/316, 343, 354, 355

[56] References Cited

U.S. PATENT DOCUMENTS

| | | |
|---|---|---|
| 5,151,921 | 9/1992 | Hashimoto ............... 375/200 |
| 5,179,573 | 1/1993 | Paradise ............... 375/208 |
| 5,323,419 | 6/1994 | Mori et al. ............... 375/200 |
| 5,375,141 | 12/1994 | Takahashi ............... 375/208 |
| 5,457,713 | 10/1995 | Sanderford, Jr. et al. ............... 375/208 |
| 5,469,470 | 11/1995 | Takahashi ............... 375/205 |

*Primary Examiner*—Stephen Chin
*Assistant Examiner*—Brian P. Webster
*Attorney, Agent, or Firm*—McDermott, Will & Emery

[57] ABSTRACT

The present invention aims to present a data reproducing apparatus for a spread spectrum signal which can synchronize quickly and accurately, using a low cost phase lock loop circuit, in spread spectrum communication. To achieve the object, a peak timing is detected from the output of a correlation circuit for despreading, the output of a correlation circuit exceeding a designated level during a bit rate period near which center the peak timing is put is integrated and data is reproduced according to the polarity of the integrated output signal. Thus, the influence of multi-path fading is reduced, synchronization is not needed in a spread band and TDD synchronization can be held quickly.

9 Claims, 5 Drawing Sheets

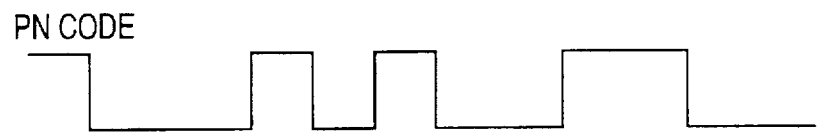
FIG. 2(a) PRIOR ART — PN CODE
FIG. 2(b) PRIOR ART — SIGNAL FROM RECEIVING APPARATUS
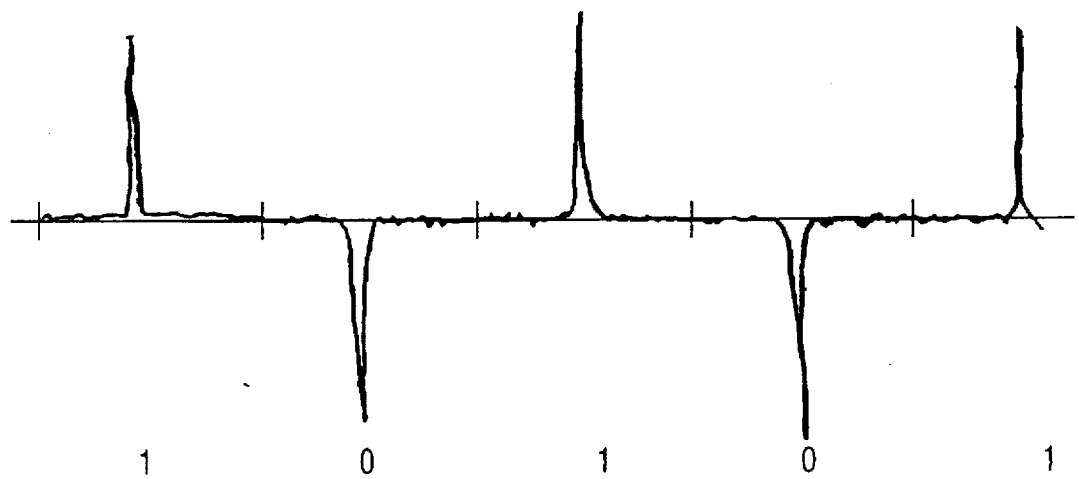
FIG. 3 PRIOR ART 5,778,023

1

DATA REPRODUCING APPARATUS FOR SPREAD SPECTRUM SIGNAL

FIELD OF THE INVENTION

The present invention relates to a data reproducing apparatus reproducing a spread spectrum signal into a data signal in communication apparatus for spread spectrum communication system.

BACKGROUND OF THE INVENTION

A spread spectrum (SS, hereafter) communication system has been used not only for military communication but for public communication and personal communication because of its high random multi-channel connection, high talking secrecy and high anti-interference.

A time division duplex (TDD, hereafter) communication apparatus for spread spectrum communication in accordance with the prior art is described below referring to drawings.

FIG. 1 is a block diagram of a transmitter and a receiver of a TDD communication apparatus for a spread spectrum signal in accordance with the prior art.

In FIG. 1, at a transmitter side, an output of a pseudo noise (PN, hereafter) code generating apparatus 1 generating a PN code is supplied to a spreading apparatus 2. Spreading apparatus 2 spreads an input signal by a PN code from PN code generating apparatus 1. The signal spread at spreading apparatus 2 is transmitted from a transmitting apparatus 3 through an antenna 4. A control apparatus 5 controls PN code generating apparatus 1, spreading apparatus 2 and transmitting apparatus 3.

At a receiver side, a receiving apparatus 7 receives the signal transmitted from transmitting apparatus 3 through an antenna 6. A PN code generating apparatus 9 generates the same PN code as that generated at PN code generating apparatus 1. A data reproducing apparatus 8 reproduces data, using a PN code outputted from PN code generating apparatus 9. A control apparatus 10 controls receiving apparatus 7, data reproducing apparatus 8 and PN code generating apparatus 9.

The performance of a TDD communication apparatus for a spread spectrum signal described above in accordance with the prior art is explained below.

At starting communication, control apparatus 5 controls PN code generating apparatus 1 to generate a PN code. At the same time, it supplies an information indicating that by what PN code a signal going to be transmitted from now is spread to transmitting apparatus 3 and controls to transmit it.

The information of the transmitted PN code is received at receiving apparatus 7 through antenna 6. Receiving apparatus 7 supplies the information of the received PN code to control apparatus 10.

Being supplied with the PN code information, control apparatus 10 controls PN code generating apparatus 9 to generate the same PN code as that included in the received PN code information.

Then, being supplied with a signal to spreading apparatus 2, spreading apparatus 2 spreads the supplied signal by the PN code from PN code generating apparatus 1 and supplies it to transmitting apparatus 3. Receiving the signal, transmitting apparatus 3 transmits a signal through antenna 4.

Receiving the transmitted signal through antenna 6, receiving apparatus 7 supplies the signal to data reproducing apparatus 8.

Data reproducing apparatus 8 reproduces a signal according to the PN code from PN code generating apparatus 9.

2

In the case of SS signal, because the original signal is spread by a PN code shown in FIG. 2(a), to reproduce the signal, it is general to always compare the receiving signal shown in FIG. 2(b) with the PN code and regard the coincident points as reproduced data. A PN code shown in FIG. 2(a) and a signal from the receiving apparatus shown in FIG. 2(b) are shown only during a period which the PN code and the signal from receiving apparatus 7 are coincident. In the case of transmitting a digital signal, the signal is discriminated as "1" or "2" by the signal polarity as shown in FIG. 3. These actions are executed at data reproducing apparatus 8.

The performance of data reproducing apparatus 8 is explained in detail using its block diagram.

FIG. 4 is a block diagram of a data reproducing apparatus 8 for a spread spectrum signal in accordance with the prior art. In FIG. 4, a base band signal supplied from receiving apparatus 7 is supplied to latch circuits 20 and 23 and a correlation circuit 22. Latch circuit 20 latches the input signal by 1 chip and inputs it to a correlation circuit 21. The 1 chip latch-means to latch a signal equivalent to a half of data transmitting time for 1 bit of a PN code. Correlation circuit 21 despreads the output of latch circuit 20 and outputs a correlation value having a polarity. Because the input of correlation circuit 21 is an output of latch circuit 20, correlation circuit 21 outputs a correlation value of the received base band signal which timing is behind by 1 chip latch from the received signal inputted to data reproducing apparatus 8. The output is supplied to data reproducing circuit 28 and peak timing detection circuit 25.

Correlation circuit 22 directly despreads the received base band signal and outputs a correlation value. Because correlation circuit 21 outputs a correlation value of the received base band signal which timing is behind by 1 chip latch, correlation circuit 22 outputs a correlation value of the received base band signal which timing is ahead of that of correlation circuit 21 by 1 chip latch.

Latch circuit 23 latches the received base band signal by 2 chip timing. The output of latch circuit 23 is supplied to correlation circuit 24 and correlation circuit 24 outputs a correlation value having a polarity.

Because the input of correlation circuit 24 is behind in timing by 2 chip latches by passing through latch circuit 23, correlation circuit 24 outputs a correlation value of a base band signal which is behind in timing by 2 latches from the received base band signal supplied to data reproducing apparatus 8. Thus, correlation circuit 24 outputs a correlation value of a received base band signal which is behind in timing by 1 latch from correlation circuit 21.

A peak timing detection circuit 25 detects a peak timing of correlation circuit 21 and outputs a signal to reset the counter in a phase locked loop (PLL, hereafter) circuit 27 described later by the timing detected at correlation circuit 21.

A comparison circuit 26 compares the correlation value levels of the outputs of correlation circuit 22 and correlation circuit 24 outputs an error signal concerning to errors of the synchronization of the received base band signal and the synchronization of the PLL circuit 27 described later.

PLL circuit 27 outputs a clock timing with a bit rate of the received base band signal according to the error signal outputted from comparison circuit 26.

A data reproducing circuit 28 reproduces data according to a polarity of the correlation value of the output of correlation circuit 21 at a bit rate timing, that is at every time which 1 bit data is supplied.

The performance of a data reproducing apparatus for spread spectrum signal in accordance with the prior art configurated like the above is described below.

Latch circuit 20 delays the received base band signal by 1 chip. Correlation circuit 21 inputs the base band signal delayed by 1 chip, despreads it and outputs a correlation value having a polarity. Correlation circuit 22 inputs the received base band signal as it is which is 1 chip ahead of correlation circuit 21 in timing, despreads it and outputs a correlation value. Latch circuit 23 delays the re received base band signal by 2 chips. Correlation circuit 24 inputs the base band signal which is 1 chip behind of correlation circuit 21 in timing, despreads it and outputs a correlation value.

Peak timing detection circuit 25 detects a peak timing of correlation circuit 21 and resets the counter in PLL circuit 27 at this timing. Comparison circuit 26 compares the correlation value level of the output of correlation circuit 22 and the correlation value level of the output of correlation circuit 24 and outputs an error signal. PLL circuit 27 controls the timing of the bit rate clock signal to a behind direction when the correlation value of correlation circuit 22 is larger than the correlation value of correlation circuit 24 and on the contrary, to an ahead direction when the correlation value of correlation circuit 22 is smaller than the correlation value of correlation circuit 24, according to the error signal of comparison circuit 26. Data reproducing circuit 28 reproduces data at a bit rate timing according to the polarity of the correlation value and outputs the reproduced data.

Thus, data can be reproduced in accurate synchronization by watching 1 latch ahead and behind of a signal to be reproduced and compensating the timing of PLL circuit 27.

In TDD communication, however, transmission and reception are alternately made at every 5 ms and never made simultaneously.

As explained above, because PLL is compensated using a received signal in the prior art, if you try to make TDD communication by this system, you have to hold a synchronization of PLL circuit 27 without compensation during transmission.

Therefore, you have to use an accurate PLL circuit which does not loose synchronization even if the receiving signal is lost and it results in cost up.

Especially, to make the cost as low as commercial wireless communication apparatus can carry, because it is difficult to carry an accurate PLL circuit which can hold synchronization as an oscillator even if the receiving signal is lost, it is necessary to repeat holding synchronization at every reception period and it is easy to be influenced by multi-path fading. These are problems.

SUMMARY OF THE INVENTION

The present invention aims to solve the above problems and presents a data reproducing apparatus for a spread spectrum signal which uses a cheap PLL circuit and can hold synchronization quickly and without fail.

To achieve the object, the present invention includes:
correlation means for despreading a spread signal and outputting a correlation value;
correlation integration means for integrating the output of the correlation means; and
data reproducing means for reproducing data according to the output of the correlation integration means, as a basic configuration.

According to this configuration, the present invention presents a data reproducing apparatus which is difficult to loose synchronization, because the data may be reproduced during a period a correlation integrated output exists.

The present invention includes:
correlation means for despreading a spread signal and outputting a correlation value;
phase lock loop means to output a sync signal;
correlation integration means for integrating the output of the correlation means, synchronizing with the sync signal from the phase lock loop means; and
data reproducing means for reproducing data according to the output of the correlation integration means, synchronizing with the sync signal from the phase lock loop means, as an expanded configuration.

According to this configuration, the present invention presents a data reproducing apparatus which is difficult to loose synchronization and does not require a highly accurate phase lock loop circuit.

The present invention includes:
correlation means for despreading a spread signal and outputting a correlation value having a polarity;
absolute value detection means for detecting an absolute value of the correlation value outputted from the correlation means;
polarity detection means for detecting a polarity of the correlation value outputted from the correlation means;
peak phase detection means for detecting a peak outputted from the absolute value detection means;
synchronization means for outputting a sync signal according to the output of the peak phase detection means;
comparison means for outputting a signal from the absolute value detection means only when the output of the absolute value detection means is over than a designated value;
correlation integration means for integrating a synthesized output of the output from the polarity detection means and the output of the comparison means synchronizing with a sync signal from the synchronization circuit for a bit rate period; and
data reproducing means to reproduce data by outputting a signal having the same polarity as the output from the correlation means, synchronizing with a sync signal from the synchronization means, as a further expanded configuration.

According to this configuration, the present invention presents a data reproducing apparatus in which a synchronization at a spread band is not needed and a high speed synchronization can be obtained at TDD communication, because the peak portion of the absolute value of the signal outputted from the correlation means is used as a sync signal and synchronization is made using a received signal itself.

BRIEF DESCRIPTION OF THE DRAWINGS

FIGS. 2 (a)–2(b) are PN code signal of a data reproducing apparatus in accordance with the prior art.

FIG. 2(a) is a PN code.

FIG. 2(b) is a signal from the receiving part.

FIG. 3 is a signal waveform outputted from a receiving apparatus 7 of a data reproducing apparatus in accordance with the prior art.

FIGS. 6 (a)–2(b) show waveforms of various points in a data reproducing apparatus for a spread spectrum signal in accordance with the exemplary embodiment of the present invention.

DESCRIPTION OF THE PREFERRED EMBODIMENTS

Figure 1:
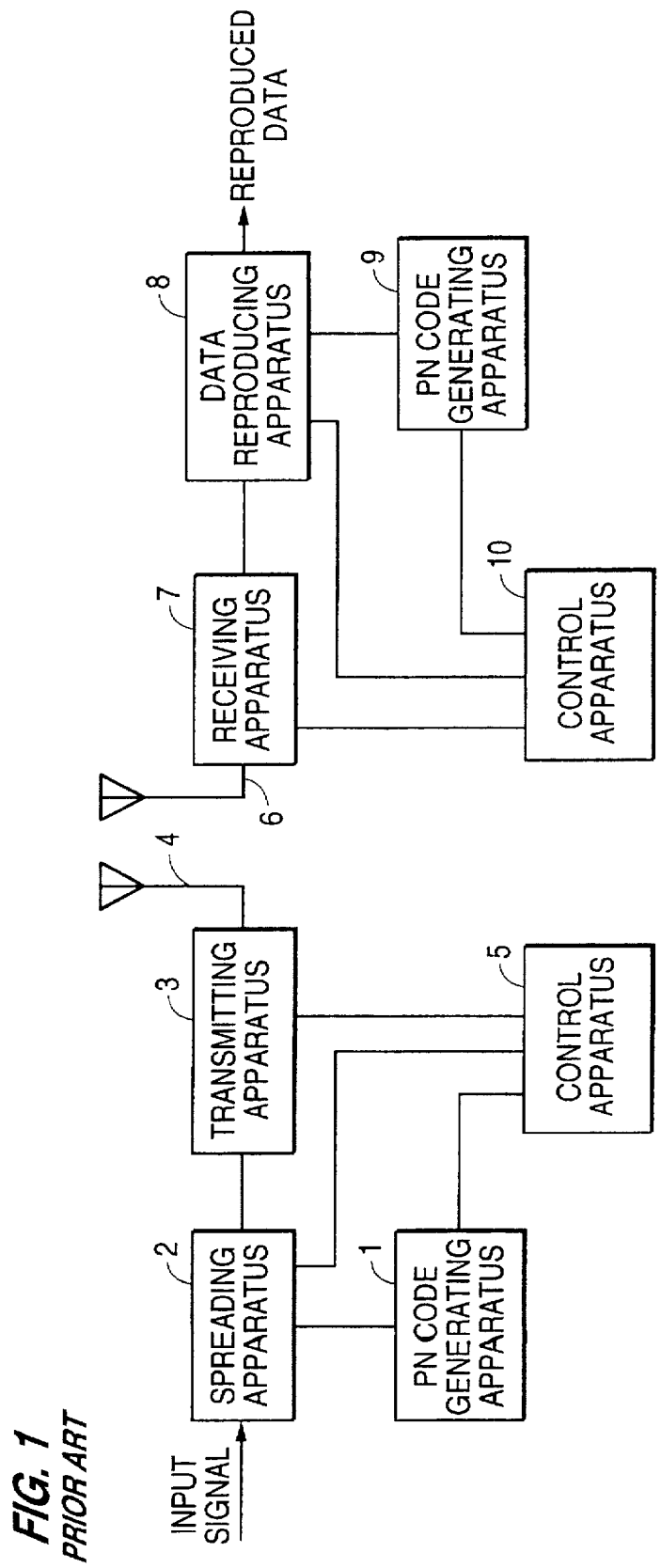
FIG. 1 is a block diagram of a transmitter and a receiver of a TDD communication equipment for a spread spectrum signal using a data reproducing apparatus in accordance with the prior art and an exemplary embodiment of the present invention.
Figure 4:
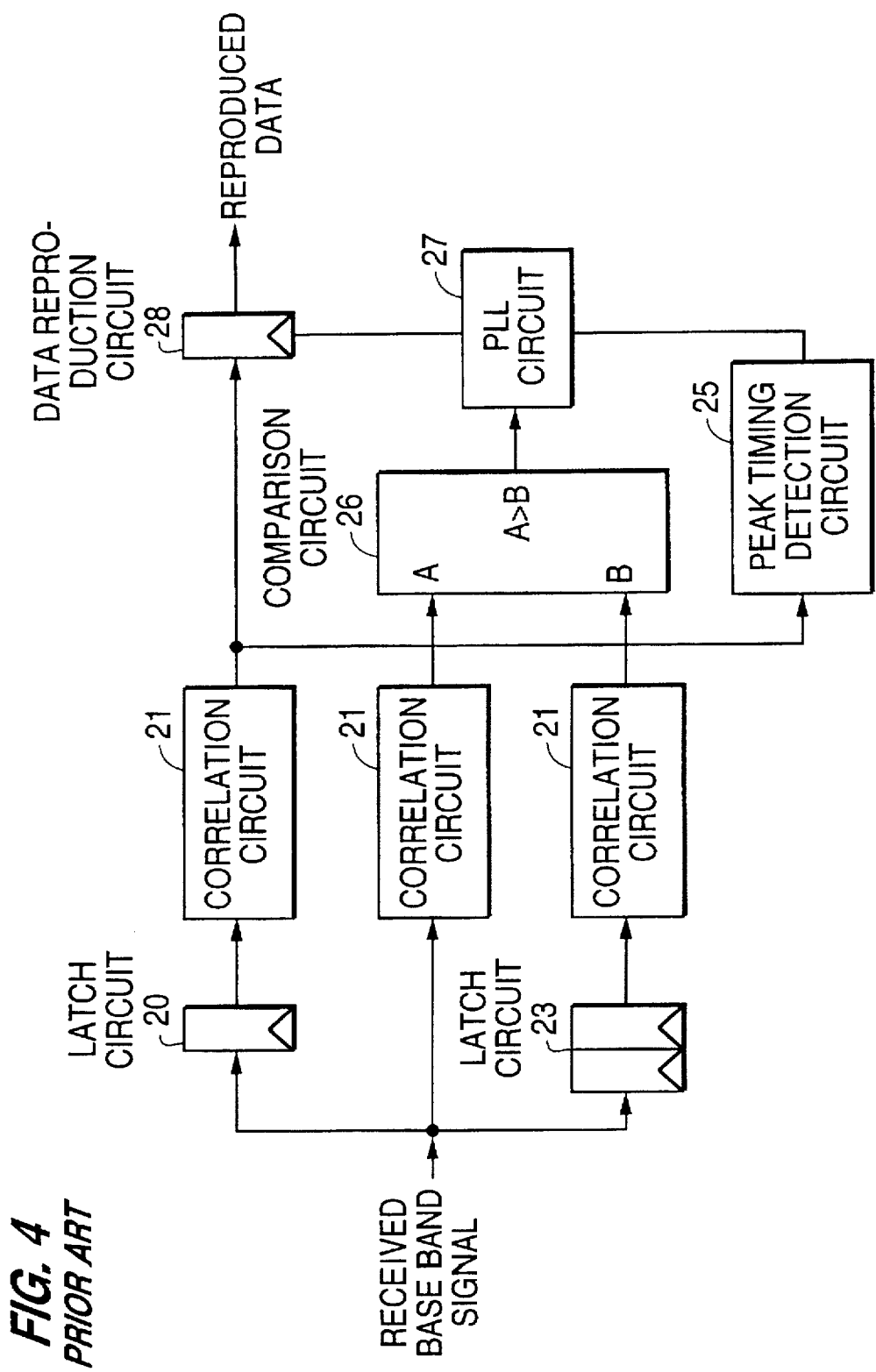
FIG. 4 is a block diagram of a data reproducing apparatus 8 in accordance with the prior art.
Figure 5:
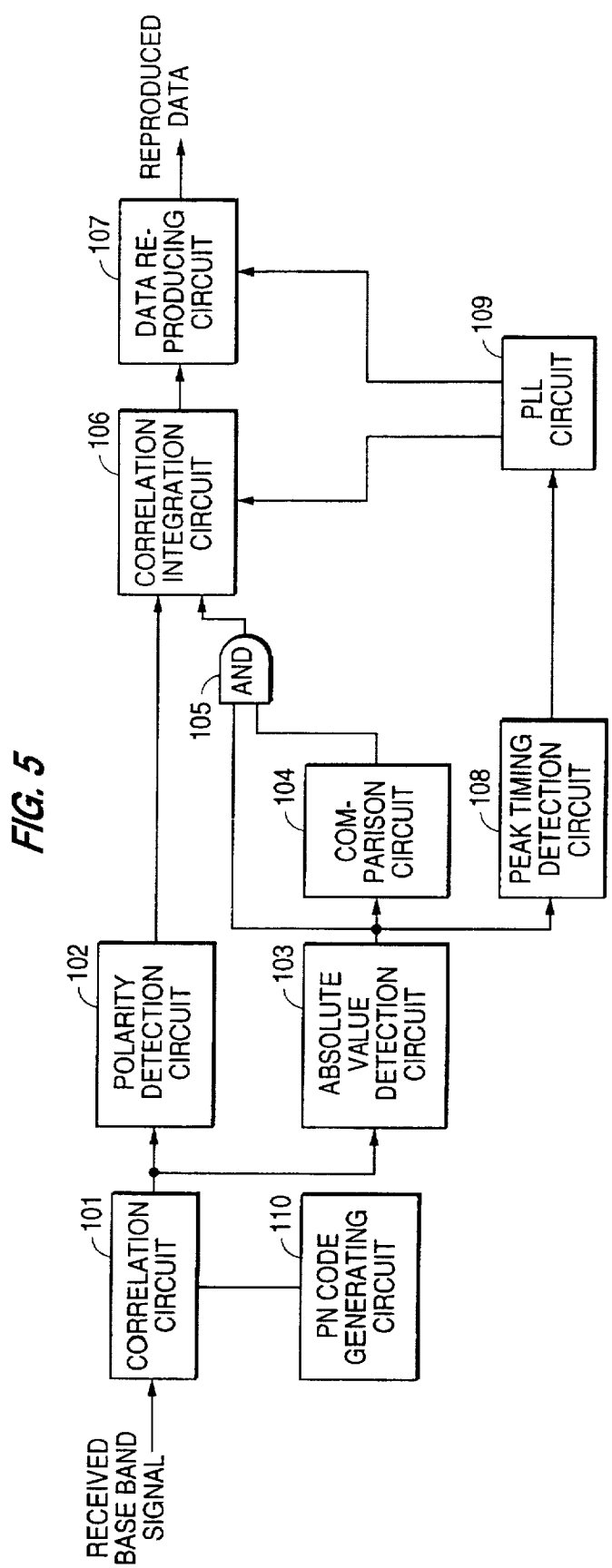
FIG. 5 is a block diagram of a data reproducing apparatus for a spread spectrum signal in accordance with an exemplary embodiment of the present invention.

An exemplary embodiment of the present invention is explained below referring to drawings. FIG. 5 is a block diagram of a data reproducing apparatus for a spread spectrum signal in accordance with an exemplary embodiment of the present invention.

In FIG. 5, a received base band signal is inputted to a correlation circuit 101. Correlation circuit 101 despreads the received base band signal, using an output of a PN code generating circuit 110 to output a PN code and outputs a correlation value having a polarity.

The correlation value outputted from correlation circuit 101 is supplied to a polarity detection circuit 102 and an absolute value detection circuit 103, polarity detection circuit 102 detects a polarity of the correlation value and outputs a polarity signal. Absolute value detection circuit 103 detects an absolute value of the correlation value outputted from correlation circuit 101 and outputs the detected absolute value. The outputted absolute value is supplied to a comparison circuit 104, an AND circuit 105 and a peak timing detection circuit 108.

Peak timing detection circuit 108 detects a peak of the output of absolute value detection circuit 103, compares the timing of the center position during a time domain of a bit rate length integrated at correlation integration circuit 106 with the timing of the detected peak position and outputs an error signal calculated from the time difference to PLL circuit 109.

PLL circuit 109 compensates and controls a clock timing of a bit rate according to the error signal outputted from peak timing detection circuit 108.

Comparison circuit 104 supplied with an output of absolute value detection circuit 103 compares the output (absolute value) of absolute value detection circuit 103 with a designated threshold value and outputs a signal only when the absolute value is larger than the threshold value.

AND circuit 105 makes an AND value signal of the output of absolute value detection circuit 103 and the output of comparison circuit 104 and supplied it to correlation integration circuit 106.

Correlation integration circuit 106 is inputted with a signal from PLL circuit 109 to control a bit rate length in time domain to be integrated, a polarity signal from polarity detection circuit 102 and an AND value signal from AND circuit 105, integrates a correlation value outputted from AND circuit 105 which is over the designated threshold value and outputs a correlation integration value added with a polarity according to the polarity signal from polarity detection circuit 102 on the integration information to data reproducing circuit 107.

Data reproducing circuit 107 reproduces data by the polarity of correlation integration value outputted from correlation integration circuit 106 according to the bit rate clock signal from PLL circuit 109 and outputs the reproduced data.

The performance of a data reproducing apparatus in accordance with the exemplary embodiment of the present invention configurated like the above is explained, referring to waveforms shown in FIGS. 6(a)–6(g).

Figure 6A:
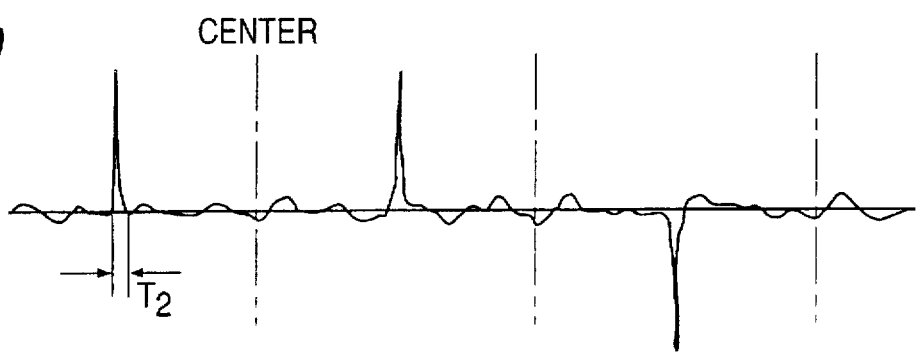
FIG. 6(a) is an waveform of a correlation value outputted from correlation circuit 101.

When a received base band signal is inputted to correlation circuit 101, correlation circuit 101 despreads, using a PN code from PN code generating circuit 110. Thus, a convex signal shown in FIG. 6(a) is outputted from correlation circuit 101 as a correlation value.

Figure 6B:
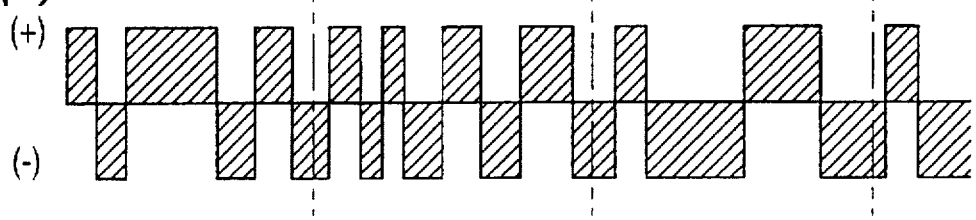
FIG. 6(b) is an waveform of a polarity signal outputted from polarity detection circuit 102.

Polarity detection circuit 102 supplied with this signal detects a polarity of the correlation value and outputs a polarity signal shown in FIG. 6(b).

Figure 6C:
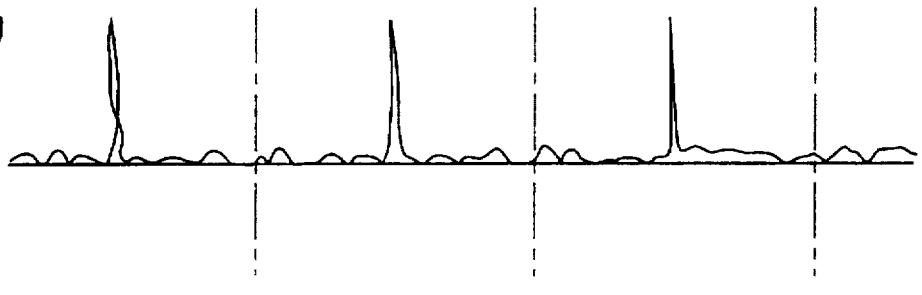
FIG. 6(c) is an waveform of an absolute value signal outputted from absolute value detection circuit 103.

Absolute value detection circuit 103 detects an absolute value of the correlation value outputted from correlation circuit 101 and outputs the detected absolute value shown in FIG. 6(c).

Figure 6D:
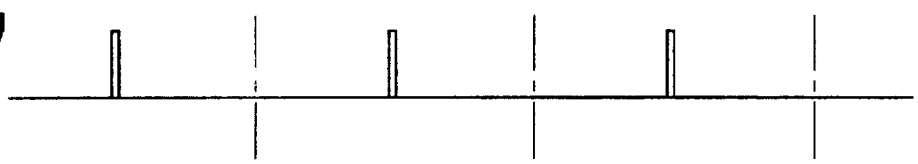
FIG. 6(d) is an waveform of an output signal of comparison circuit 104.

The output of absolute value detection circuit 103 is inputted to comparison circuit 104. Comparison circuit 104 compares this input value with a predetermined threshold value and outputs a signal as shown in FIG. 6(d), when the output from absolute value detection circuit 103 is larger than the threshold value.

Figure 6E:
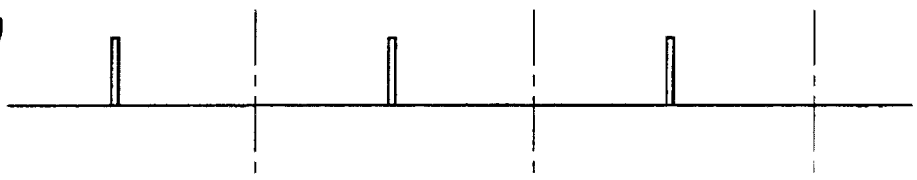
FIG. 6(e) is an waveform of an AND value outputted from AND circuit 105.

Then, AND circuit 105 makes an AND value of the output of comparison circuit 104 and the output of absolute value detection circuit 103, as shown in FIG. 6(e). Only an absolute value exceeding the threshold value at comparison circuit 104 is outputted from AND circuit 105.

The output of absolute value detection circuit 103 is inputted also to peak timing detection circuit 108. Peak timing detection circuit 108 detects a timing when peaks of the output of absolute value detection circuit 103, that is a timing when peaks of the absolute value of the output of correlation circuit 101 appear, compares the timing of the peak of the output of correlation circuit 101 with the timing of the center position during a time domain of a bit rate length integrated at correlation integration circuit 106 and outputs an error signal.

PLL circuit 109 controls the bit rate timing to a proceeding direction when the center position of the output during a bit rate length in time domain to be integrated is behind of the peak position to the output of correlation circuit 101 and on the contrary, to a lagging direction when the center position of the output during a bit rate length in time domain to be integrated is ahead of the peak position to the output of correlation circuit 101, according to the above described error signal.

PLL circuit 109 outputs a clock signal of bit rate to data reproducing circuit 107 and outputs a signal to control a bit rate length in time domain to be integrated to correlation integration circuit 106.

Figure 6F:
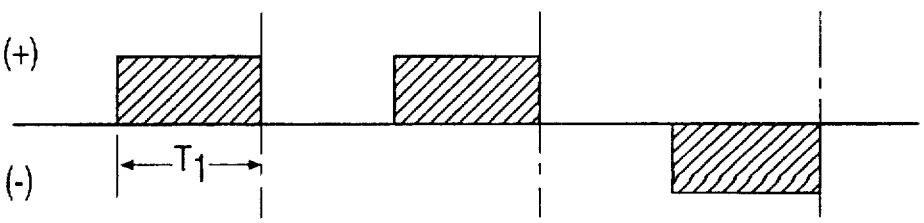
FIG. 6(f) is an waveform of a correlation integration value outputted from correlation integration circuit 106.

Correlation integration circuit 106 integrates correlation values exceeding a designated threshold value of AND circuit 105 at every bit rate from the signal to control a bit rate length in time domain to be integrated outputted from PLL circuit 109 and the received signal output exceeding the threshold value outputted from AND circuit 105 and outputs a correlation integration value shown in FIG. 6(f) by adding a polarity according to a polarity signal from polarity detection circuit 102 to this integration information. The output signal is reset at every termination of 1 bit rate.

Figure 6G:
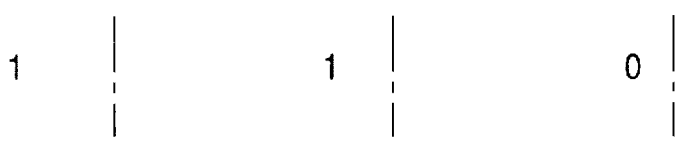
FIG. 6(g) is a reproduced data outputted from data reproducing circuit 107.

Data reproducing circuit 107 reproduces the correlation integration value output into a data according to a bit rate clock signal from PLL circuit 109, as shown in FIG. 6(g).

According to the above-described actions, data reproducing circuit 107 is considered to reproduce data on the basis of the polarity of the signal integrated about larger parts of the received signal than the threshold level. Therefore, it is possible to reproduce data if the signal is in the range indicated as period T1 in FIG. 6(f).

Accordingly, data reproduction is possible even if the clock accuracy of PLL circuit 109 is not so high.

Thus, correlation circuit 101, correlation integration circuit 106 and data reproducing circuit 107 are the most basic blocks of the present invention and it becomes possible to lengthen a period which is possible to reproduce data according to the above-described configuration.

On the contrary, because the received signal is directly reproduced, that is reproduced according to the convex signal shown in FIG. 6(a) in the prior art, the period which data reproduction is possible is restricted to a narrow period indicated as period T2 shown in FIG. 6(a).

Therefore, synchronization may loose unless the PLL circuit has considerably high accuracy.

According to the exemplary embodiment of the present invention, because data can be reproduced even if synchronization is not perfectly held, in the case of communication in which a received signal is lost during talking like at TDD communication, data can be reproduced even if a PLL circuit having not so high accuracy such as for commercial use is used or even if synchronization is not repeated to hold at every receiving frame.

The present invention can be configurated using circuits having individual functions and a part of circuits or all circuits can be realized with a software of a microcomputer.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. A data reproducing apparatus for a spread spectrum signal comprising:
   correlation means for despreading a spread signal and outputting a correlation value;
   correlation integration means for integrating an output from said correlation means and resetting the integrated value every termination of one bit rate of the spread signal; and
   data reproducing means for reproducing data corresponding to an output from said correlation integration means, wherein said data reproducing means detects both a negative or positive sign and an absolute value of the integrated value while said correlation integration means outputs integrated values of the outputs from said correlation means.

2. A data reproducing apparatus for a spread spectrum signal as recited in claim 1 further comprising:
   receiving means for receiving a wireless signal; and wherein, said correlation means despreads a wireless signal which
   said receiving means received.

3. A data reproducing apparatus for a spread spectrum signal as recited in claim 1; wherein,
   said correlation integration means integrates only the output from said correlation means exceeding a designated level.

4. A data reproducing apparatus for a spread spectrum signal as recited in claim 2; wherein,
   said correlation integration means integrates only the output from said correlation means exceeding a designated level.

5. A data reproducing apparatus for a spread spectrum signal comprising:
   correlation means for despreading a spread signal and outputting a correlation value;
   synchronizing means for outputting a synchronous signal;
   correlation integration means for integrating an output from said correlation means by synchronizing a synchronous signal tapped off from said synchronizing means and resetting the integrated value every termination of one bit rate of the spread signal and
   data reproducing means for reproducing data corresponding to an output from said correlation integration means by synchronizing the synchronous signal tapped off from said synchronizing,
   wherein said data reproducing means detects both a negative or positive sign and an absolute value of the integrated value corresponding to the synchronous signal tapped off from said synchronizing means while said correlation integration means outputs integrated values of the outputs from said correlation means.

6. A data reproducing apparatus for a spread spectrum signal as recited in claim 5 further comprising:
   receiving means for receiving a wireless signal; and wherein,
   said correlation means despreads a wireless signal which said receiving means received.

7. A data reproducing apparatus for a spread spectrum signal as recited in claim 5, wherein
   said correlation integration means integrates only the output from said correlation means exceeding a designated level.

8. A data reproducing apparatus for a spread spectrum signal as recited in claim 6, wherein
   said correlation integration means integrates only the output from said correlation means exceeding a designated level.

9. A data reproducing apparatus for a spread spectrum signal comprising:
   correlation means for despreading a spread signal and outputting a correlation value having a negative or positive sign;
   absolute value detection means for detecting an absolute value of the correlation value outputted from said correlation means;

sign detection means for detecting a negative or positive sign of the correlation value outputted from said correlation means;

peak timing detection means for detecting peak timing of the output from said absolute value detecting means;

synchronization means for outputting a synchronous signal corresponding to the output from said peak timing detecting means;

comparison means for outputting the signal from said absolute value detection means only when the output of said absolute value detection means is larger than a designated value;

correlation integration means for integrating the synthesized output of the output from said sign detection means and the output from said comparison means during a bit rate length, by synchronizing the synchronous signal tapped off from said synchronization means; and data reproducing means for reproducing data by outputting a sign of the output from said correlation means by synchronizing with the synchronous signal of said synchronization means;

wherein said data reproducing means detects both a negative or positive sign and an absolute value of the integrated value corresponding to the synchronous signal tapped off from said synchronizing means while said correlation integration means outputs integrated values of the outputs from said correlation means.

* * * * *

UNITED STATES PATENT AND TRADEMARK OFFICE
CERTIFICATE OF CORRECTION

PATENT NO. : 5,778,023
DATED : July 7, 1998
INVENTOR : Ideta et al.

It is certified that error appears in the above-identified patent and that said Letter Patent is hereby corrected as shown below:

Claim 5, line 33, delete "signaland" and insert --signal and--.

Signed and Sealed this

Seventh Day of March, 2000

Attest:

Attesting Officer

Q. TODD DICKINSON

Commissioner of Patents and Trademarks